United States Patent
Choi

(10) Patent No.: US 12,217,690 B2
(45) Date of Patent: Feb. 4, 2025

(54) UNDER-DISPLAY SENSOR OPERATION

(71) Applicant: Google LLC, Mountain View, CA (US)

(72) Inventor: Sangmoo Choi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/553,136

(22) PCT Filed: Aug. 9, 2021

(86) PCT No.: PCT/US2021/045194
§ 371 (c)(1),
(2) Date: Sep. 28, 2023

(87) PCT Pub. No.: WO2023/018404
PCT Pub. Date: Feb. 16, 2023

(65) Prior Publication Data
US 2024/0185789 A1    Jun. 6, 2024

(51) Int. Cl.
*G09G 3/3233* (2016.01)
*G06V 40/13* (2022.01)

(52) U.S. Cl.
CPC ....... *G09G 3/3233* (2013.01); *G06V 40/1318* (2022.01); *G09G 2300/0819* (2013.01); *G09G 2300/0842* (2013.01); *G09G 2300/0861* (2013.01); *G09G 2320/0626* (2013.01); *G09G 2354/00* (2013.01)

(58) Field of Classification Search
CPC ....... G06V 40/1318; G09G 2300/0819; G09G 2300/0842; G09G 2300/0861; G09G 2320/0626
See application file for complete search history.

(56) References Cited

U.S. PATENT DOCUMENTS

| | | | |
|---|---|---|---|
| 10,467,985 B2 | 11/2019 | Aflatooni et al. | |
| 10,679,030 B2 | 6/2020 | Shepelev et al. | |
| 10,755,065 B2 | 8/2020 | Wu et al. | |
| 10,777,168 B2 | 9/2020 | Han et al. | |
| 2019/0266374 A1* | 8/2019 | Lee | G06F 1/1684 |
| 2021/0072823 A1 | 3/2021 | Selan | |

FOREIGN PATENT DOCUMENTS

EP    3407177 A1    11/2018

OTHER PUBLICATIONS

International Search Report and Written Opinion of International Application No. PCT/US2021/045194, dated May 3, 2022, 18 pp.
Response to Communication Pursuant to Rules 161(1) and 162 EPC dated Mar. 19, 2024, from counterpart European Application No. 21762309.9, filed Jul. 25, 2024, 20 pp.

\* cited by examiner

*Primary Examiner* — Abbas I Abdulselam
(74) *Attorney, Agent, or Firm* — Shumaker & Sieffert, P.A.

(57) ABSTRACT

An example device includes a display panel; a fingerprint sensor configured to sense a fingerprint through the display panel; and processing circuitry configured to: responsive to activation of the fingerprint sensor: activate a local high brightness mode by at least increasing an amount of light radiated from a first portion of the display panel that overlies the fingerprint sensor; and temporarily decrease controlled brightness of a second portion of the display panel that is non-overlapping with the first portion.

19 Claims, 10 Drawing Sheets

FIG. 1B

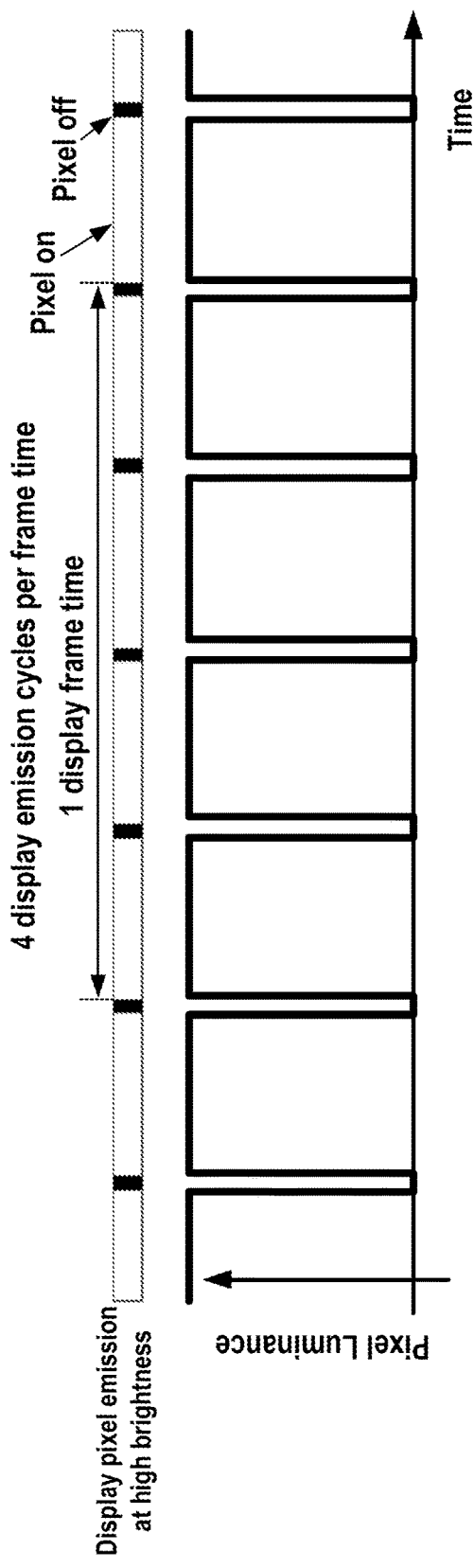
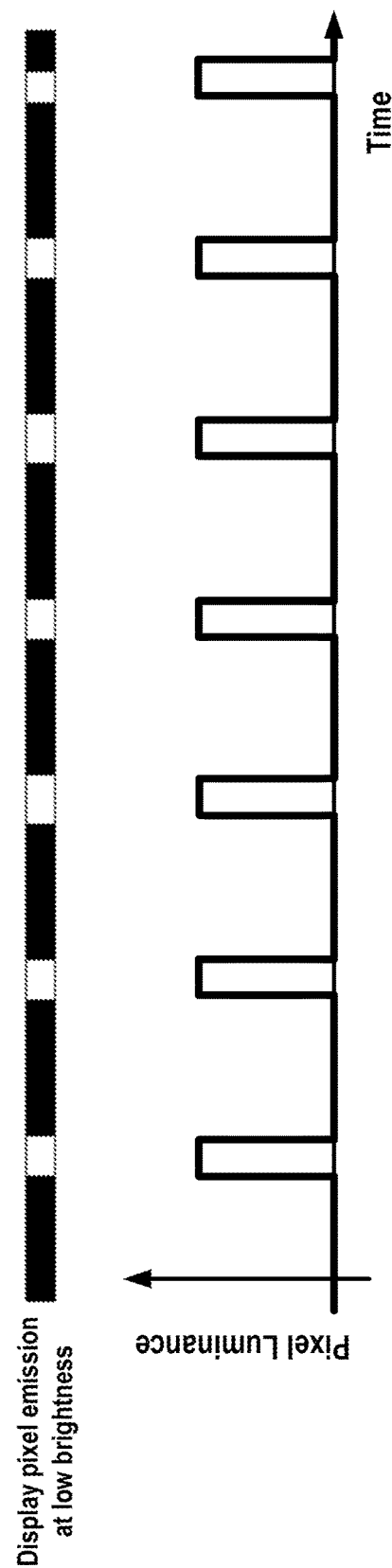
FIG. 4A
FIG. 4B

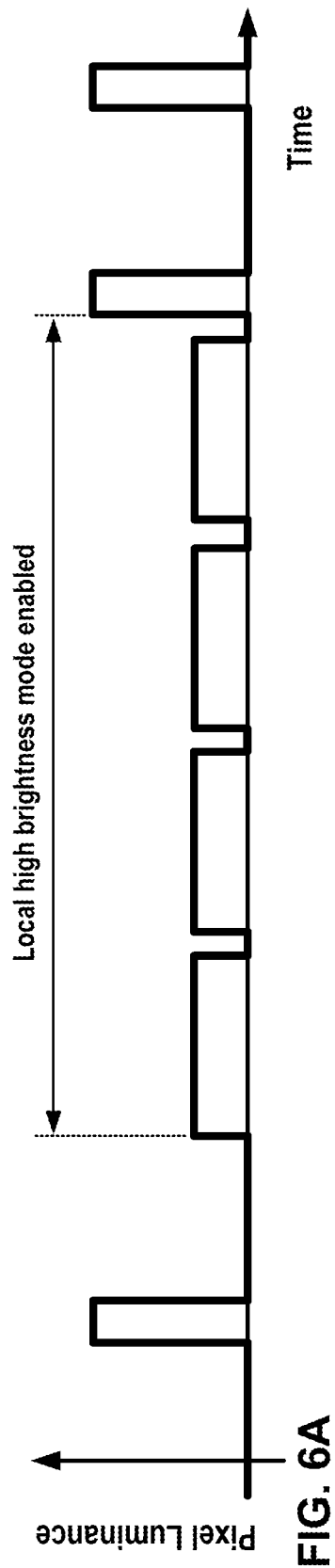
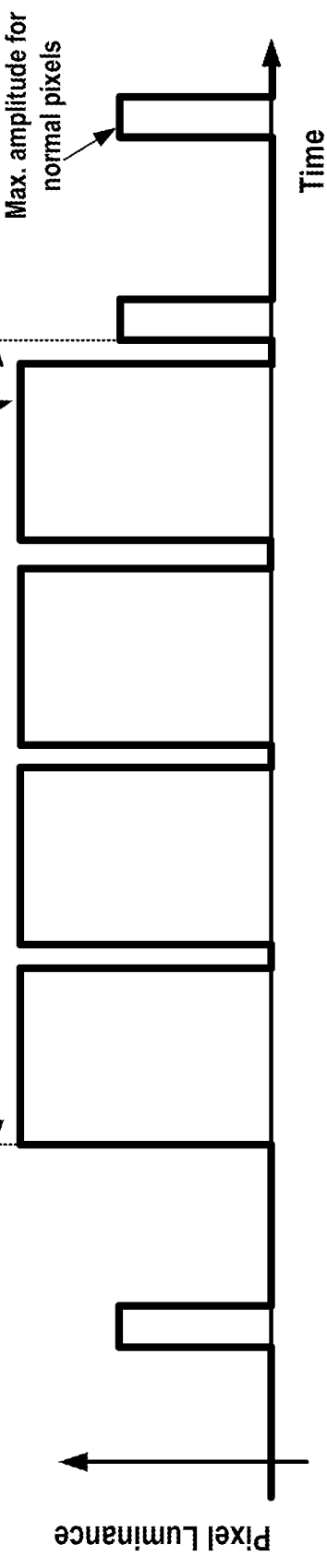
FIG. 6A
FIG. 6B

UNDER-DISPLAY SENSOR OPERATION

BACKGROUND

Computing devices, such as cellular phones and so-called smartphones, may include a display by which to present images (including sequences of images forming videos, animations, etc. and/or computer-generated user interfaces and other forms of images). As smartphones and other types of power-limited devices, such as laptop computers, smart-watches, smart-glasses, smart-hubs, extended reality (XR) devices, and the like, may consume power from power limited sources, such as a battery, these power-limited devices may employ more power-efficient displays, such as organic light emitting diode (OLED) displays (including active-matrix OLED—AMOLED displays), compared to ordinary LED displays.

Further, to provide for a more comfortable viewing experience, the power-limited devices may employ larger displays. To increase the size of displays, various sensors may be configured to operate underneath the display (which may be referred to as "under-display sensors"), and thereby avoid notches, holes, or other modification to the display that detract from the viewing experience. While the size and shape of displays that allow for under-display sensors (which may be referred to as "pass-through displays") may improve compared to displays having notches, holes, or other modifications (which may be referred to as "modified displays"), other disadvantages may be introduced.

SUMMARY

Various aspects of this disclosure are directed to a computing device configured to provide consistent brightness at a display during operation of a fingerprint sensor that senses through the display. An under-display fingerprint sensor may utilize light emitted by pixels of the display that overlie the under-display fingerprint sensor to sense fingerprints (e.g., the sensor may detect light reflected by a user's finger in contact with, or proximate to, the display). As such, it may be desirable for the pixels that overlie the under-display fingerprint sensor to operate at a high brightness level (e.g., emit a large amount of light) during operation of the under-display fingerprint sensor. However, to avoid interfering with other pixels of the display, it may be desirable for the pixels that overlie the under-display fingerprint sensor to operate at the high brightness level without interfering with apparent brightness levels of other pixels (i.e., pixels that do not overlie the fingerprint sensor).

A computing device may control brightness of pixels of a display via modification of an amplitude and/or a duty ratio of an emission signal provided to the pixels (e.g., via one or both of pulse width modulation (PWM) and/or pulse amplitude modification (PAM)). For instance, when a brightness level of the display is above a threshold brightness, the computing device may adjust the brightness level by adjusting the amplitude of the emission signal. Similarly, when the brightness level of the display is below the threshold brightness, the computing device may adjust the brightness level by adjusting the duty ratio of the emission signal.

When the computing device is controlling the brightness level of the display via duty ratio adjustment (e.g., when the brightness level is below the threshold brightness) and the under-display fingerprint sensor is activated, the computing device may transition to controlling the brightness level of the display via amplitude adjustment of the emission signal. The computing device may apply a higher amplitude emission signal to pixels overlying the fingerprint sensor. As such, this technique may be referred to as local high brightness mode (e.g., because the local brightness of pixels overlying the fingerprint sensor is higher than the brightness of pixels not overlying the fingerprint sensor. However, while it is possible for the pixels of the display to operate at a particular brightness level when the computing device controls the brightness level via either duty ratio or amplitude adjustment, the transition between the two control schemes may result in visible artifacts in the display (e.g., flicker). It may be desirable to eliminate and/or reduce the visual appearance of such visible artifacts when transitioning into the local high brightness mode.

In accordance with one or more aspects of this disclosure, when transitioning to the local high brightness mode, a computing device may temporarily adjust a brightness level of pixels not overlying the fingerprint sensor. As transitioning to the local high brightness mode may result in a temporary visible increase in the brightness of pixels of the display panel that do not overlie the fingerprint sensor, the temporary adjustment of the brightness level may, at least in part, cancel-out said temporary visible increase in brightness. In this way, a computing device may eliminate and/or reduce the visual appearance of such visible artifacts when transitioning into the local high brightness mode.

In one example, a device includes a display panel; a fingerprint sensor configured to sense a fingerprint through the display panel; and processing circuitry configured to: responsive to activation of the fingerprint sensor: activate a local high brightness mode by at least increasing an amount of light radiated from a first portion of the display panel that overlies the fingerprint sensor; and temporarily decrease controlled brightness of a second portion of the display panel that is non-overlapping with the first portion.

In another example, a method includes, responsive to activation of a fingerprint sensor that is configured to sense a fingerprint through the display panel: activating a local high brightness mode by at least increasing an amount of light radiated from a first portion of the display panel that overlies the fingerprint sensor; and temporarily decreasing controlled brightness of a second portion of the display panel that is non-overlapping with the first portion.

In another example, a computer-readable storage medium stores instructions that, when executed by a controller of a device, cause the controller to responsive to activation of a fingerprint sensor of the device that is configured to sense a fingerprint through the display panel: activate a local high brightness mode by at least increasing an amount of light radiated from a first portion of the display panel that overlies the fingerprint sensor; and temporarily decrease controlled brightness of a second portion of the display panel that is non-overlapping with the first portion.

The details of one or more examples of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A is a conceptual diagram illustrating an example of pixel luminance when computing device 100 adjusts the brightness level by adjusting the amplitude of the emission signal (EM).

FIG. 4B is a conceptual diagram illustrating an example of pixel luminance when computing device 100 adjusts the brightness level by adjusting the pulse width of the emission signal (EM).

FIGS. 6A and 6B are conceptual diagrams illustrating examples of pixel luminance when computing device 100 activates the LHBM.

DETAILED DESCRIPTION

Figure 1B:
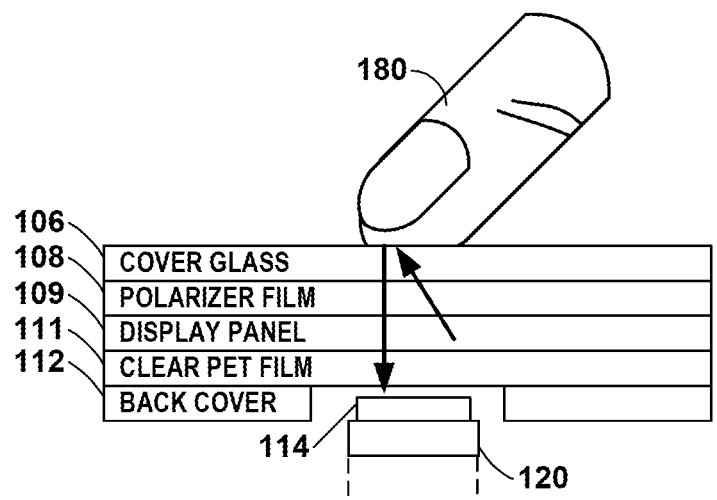
FIGS. 1A and 1B are diagrams illustrating an example computing device 100 configured to perform various aspects of the brightness modification techniques for under-display fingerprint sensing described in this disclosure.
Figure 1A:
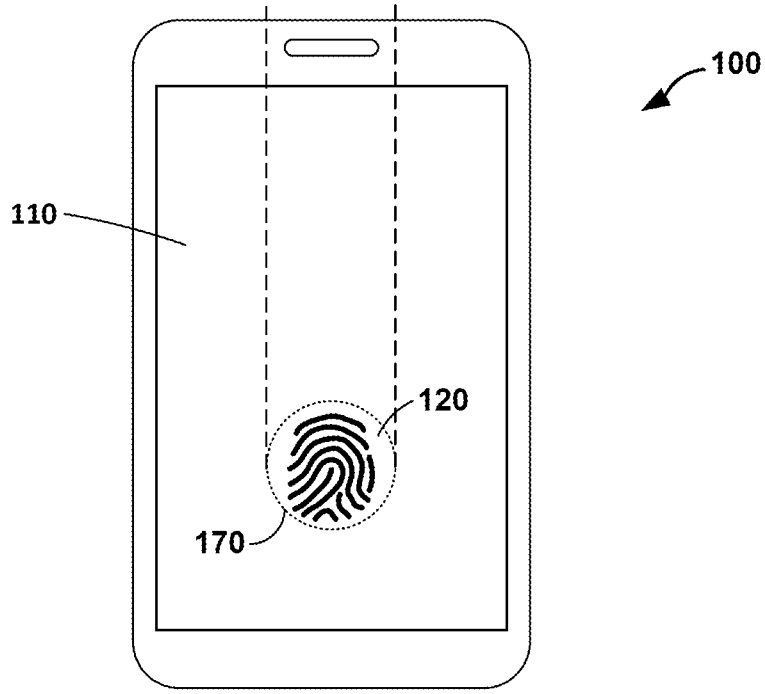

FIGS. 1A and 1B are diagrams illustrating an example computing device 100 configured to perform various aspects of the brightness modification techniques for under-display fingerprint sensing described in this disclosure. Computing device 100 may include a display 110 and an under-display sensor 120 ("UDS 120"). FIG. 1A illustrates a front perspective view of computing device 100. FIG. 1B illustrates an example cross section view of computing device 100.

Referring first to the example of FIG. 1A, computing device 100 may represent any type of computing device, such as a smart phone, a smart television, a smartwatch, smartglasses, a laptop computer, a handheld game console, a smart hub, a smart display, etc. Display 110 may include an array of light emitting pixels that form a display panel. In operation, display 110 may display an image by activating the light emitting pixels according to image data. Display 110 may be, for example, an active-matrix organic light emitting diode (AMOLED) display or other type of OLED display, a light emitting diode (LED) display, and/or liquid crystal displays (LCD). Computing device 100 includes UDS 120 positioned under display 110 when considered from the front perspective as shown in the example of FIG. 1A.

Referring to FIG. 1B, a top layer of the cross section of computing device 100 includes display 110, which represents an arrangement of a cover glass 106, a polarizer film 108, a display panel 109, a clear PET film 111, and a back cover 112 (of display 110, not computing device 100). Polarizer film 108 is arranged under the cover glass 106. Display panel 109, representing an array of light emitting pixels, is arranged under the polarizer film 108, where clear PET film 111 (which represents a type of polyester film) is arranged under display panel 109. Back cover 112 is arranged under clear PET film 111.

UDS 120 is arranged at least partially under display 110. For example, UDS 120 may be located under the display panel 109, from the cross-sectional view of computing device 100. In some examples, UDS 120 may be coupled to a motherboard or other logic circuitry of computing device 100, while in other examples UDS 120 may be coupled to a back cover 112 of the display 110.

In the example of FIG. 1, UDS 120 may be an under-display fingerprint sensor that includes receiver 114. In operation, pixels overlying UDS 120 may emit light that is, at least in part, reflected back by a fingerprint of a user whose finger (e.g., finger 180) is brought into proximity with the portion of the display overlying UDS 120. Receiver 114 may receive a returning signal through the pixel array forming, at least in part, display panel 109 (arrows indicate path of light from display panel 109 to receiver 114). Based on the signal received by receiver 114, computing device 100 may determine whether or not the fingerprint of the user is known/recognized and take appropriate action (e.g., unlock the device where the fingerprint is recognized).

As such, display 110 may allow one or more sensors to operate underneath display 110, in which the sensor signals and other external signals may pass-through various layers of the display 110 (which may be denoted as a "pass-through display 110"). To facilitate the pass-through nature of pass-through display 110 various back coverings on pass-through display 110 may be omitted during construction of pass-through display 110 at locations above and/or adjacent to a location of UDS 120 under pass-through display 110. That is, pass-through display 110 may include a back cover formed from foam (or other types of cushions) and copper (Cu) films that are removed in areas of back cover above 112 and/or adjacent to a location of UDS 120. The omission of back cover 112 allows the sensor signals and other external signals (e.g., light reflecting off a user's finger) to pass through display 110.

As noted above, UDS 120 may sense a fingerprint of a user based on light emitted by pixels of display panel 109. In general, it may be desirable for the portion of display panel 109 overlying UDS 120 to output a large quantity of light (e.g., operate a high illumination, such as 600 nits or more). However, when computing device 100 operates display panel 109 at a low brightness setting (e.g., 50 nits), the relatively low quantity of light may make it difficult for enough light to be reflect to receiver 114 for a fingerprint to be adequately sensed. As such, it may be desirable for the pixels of display panel 109 that overlie UDS 120 to operate at a high brightness level (e.g., emit a large amount of light) during operation of UDS 120. However, to avoid interfering with other pixels of display panel 109, it may be desirable for the pixels that overlie UDS 120 to operate at the high brightness level without interfering with apparent brightness levels of other pixels of display panel 109 (i.e., pixels that do not overlie UDS 120). As such, computing device 100 may activate a local high brightness mode by at least increasing a brightness of a first portion 170 of display panel 109 that overlies UDS 120. However, activation of the local high brightness mode may result in visible artifacts in the display (e.g., flicker). It may be desirable to eliminate and/or reduce the visual appearance of such visible artifacts when activating the local high brightness mode.

In accordance with one or more aspects of this disclosure, when transitioning to the local high brightness mode, computing device 100 may temporarily adjust a controlled brightness level of pixels of display panel 109 not overlying the fingerprint sensor. For instance, responsive to activation of UDS 120 (i.e., a fingerprint sensor), processing circuitry of computing device 100 may activate a local high brightness mode of display 110 by at least increasing a brightness of a first portion of display panel 109 that overlies UDS 120 (e.g., region 170); and temporarily decrease controlled brightness of a second portion of display panel 109 that is non-overlapping with the first portion (e.g., portions of display panel 109 other than region 170). As transitioning to the local high brightness mode may result in a temporary visible increase in the brightness of pixels of display panel 109 that do not overlie UDS 120, the temporary adjustment of the controlled brightness level may, at least in part, cancel-out said temporary visible increase in brightness. In this way, computing device 100 may eliminate and/or reduce the visual appearance of such visible artifacts when transitioning into the local high brightness mode. As such, despite changing the controlled brightness level, a user of computing device 100 may perceive no changes in luminance/brightness when local high brightness mode is activated.

Figure 2:
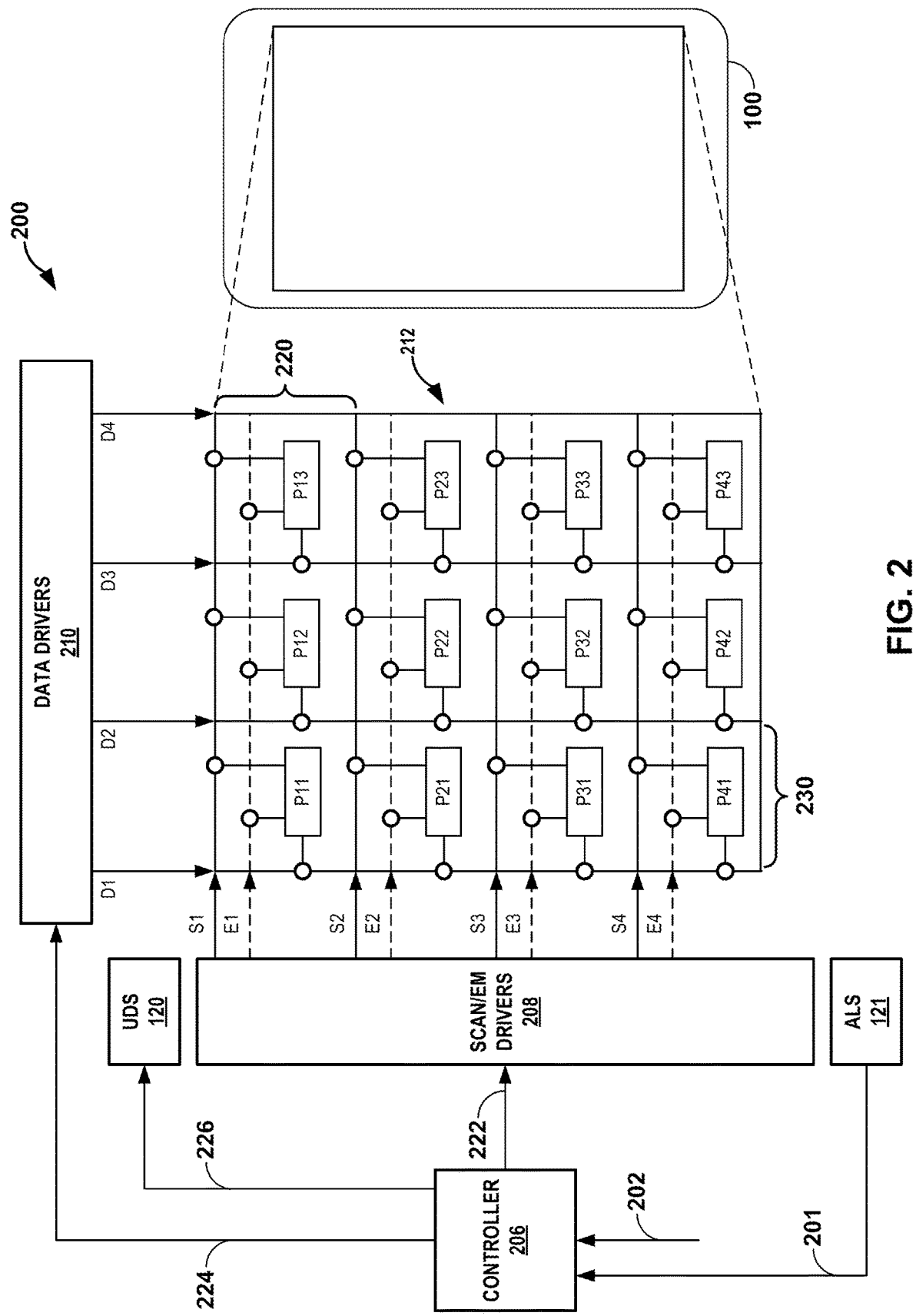
FIG. 2 is a diagram illustrating, in more detail, the computing device shown in the example of FIGS. 1A and 1B when configured to perform various aspects described in this disclosure.

FIG. 2 is a diagram illustrating, in more detail, the computing device shown in the example of FIGS. 1A and 1B when configured to perform various aspects described in this disclosure. As shown in the example of FIG. 2, display 200 may represent an example of display 110, where display 200 represents an OLED display system that includes an array 212 of light emitting pixels. Each light emitting pixel includes an OLED.

Drivers, including SCAN/EM drivers 208 and data drivers 210, may drive OLED display 200. SCAN/EM drivers 208 may be integrated, i.e., stacked, row line drivers. In some examples, SCAN/EM drivers 208 identifies a row of pixels in the display, and data drivers 210 provide data signals (e.g., voltage data) to the pixels in the selected row to cause the OLEDs to output light according to image data. Signal lines such as scan lines, EM lines, and data lines may be used in controlling the pixels to display images on the display. Though FIG. 2 illustrates OLED display 200 as having SCAN/EM drivers 208 on one side, SCAN/EM drivers 208 may be arranged on both left and right sides of OLED display 200 improving the driving performance (e.g., speed), compared to when such drivers are placed on only the left side or only the right side of OLED display 200.

OLED display 200 includes pixel array 212 that includes a plurality of light emitting pixels, e.g., the pixels P11 through P43. A pixel is a small element on a display that can change color based on the image data supplied to the pixel. Each pixel within pixel array 212 can be addressed separately to produce various intensities of color. Pixel array 212 extends in a plane and includes rows and columns.

Each row extends horizontally across pixel array 212. For example, a first row 220 of the pixel array 212 includes pixels P11, P12, and P13. Each column extends vertically down the pixel array 212. For example, first column 230 of the pixel array 212 includes pixels P11, P21, P31, and P41. Only a subset of the pixels are shown in FIG. 2 for ease of illustration purposes and OLED display 200 may include hundreds, thousands, or millions of pixels (and possibly more in high resolution displays). In practice, there may be several million pixels in the pixel array 212. Greater numbers of pixels can result in higher resolution.

OLED display 200 includes SCAN/EM drivers 208 and data drivers 210. SCAN/EM drivers supply SCAN and EM signals to rows of pixel array 212. SCAN/EM drivers 208 supply, in the example of FIG. 2, scan signals via scan lines S1 to S4, and EM signals via EM lines E1 to E4, to respective rows of pixels. Data drivers 210 supply signals to columns of pixel array 212. In the example of FIG. 2, data drivers 210 supply data signals, via data lines D1 to D4, to the columns of pixels.

Each pixel in the pixel array 212 is addressable by a horizontal scan line and EM line, and a vertical data line. For example, pixel P11 is addressable by scan line S1, EM line E1, and data line D1. In another example, pixel P32 is addressable by scan line S3, EM line E3, and data line D2.

SCAN/EM drivers 208 and data drivers 210 provide signals to the pixels enabling the pixels to reproduce the image. SCAN/EM drivers 208 and data drivers 210 provide the signals to the pixels via the scan lines, the emission lines, and the data lines. To provide the signals to the pixels, SCAN/EM drivers 208 select a scan line and control the emission operation of the pixels. Data drivers 210 provides data signals to pixels addressable by the selected scan line to light the selected OLEDs according to the image data.

The scan lines are addressed sequentially for each frame. A frame is a single image in a sequence of images that are displayed. A scan direction determines the order in which the scan lines are addressed. In OLED display 200, the scan direction is from top to bottom of the pixel array 212. For example, scan line S1 is addressed first, followed by the scan lines S2, then S3, etc.

OLED display 200 includes a controller 206 that receives display input data 202. Controller 206 generates scan control signals 222 and data control signals 224 from display input data 202. Scan control signals 222 may drive SCAN/EM drivers 208. Data control signals 224 may drive the data drivers 210. Controller 206 controls the timing of the scan signals and EM signals through scan control signals 222. Controller 206 controls the timing of the data signals through the data control signals 224.

Controller 206 can also control the timing of UDS 120. Controller 206 can control the timing of UDS 120 through sensor control signals 226, which may also be referred to a synchronization signals. Sensor control signals 226 may include start and stop signals. Controller 206 may send a start signal to UDS 120 to allow UDS 120 to emit electromagnetic radiation, e.g., an IR pulse. Controller 206 may send a stop signal to UDS 120 to cause UDS 120 to cease emitting electromagnetic radiation, or to prevent UDS 120 from emitting electromagnetic radiation.

Figure 3:
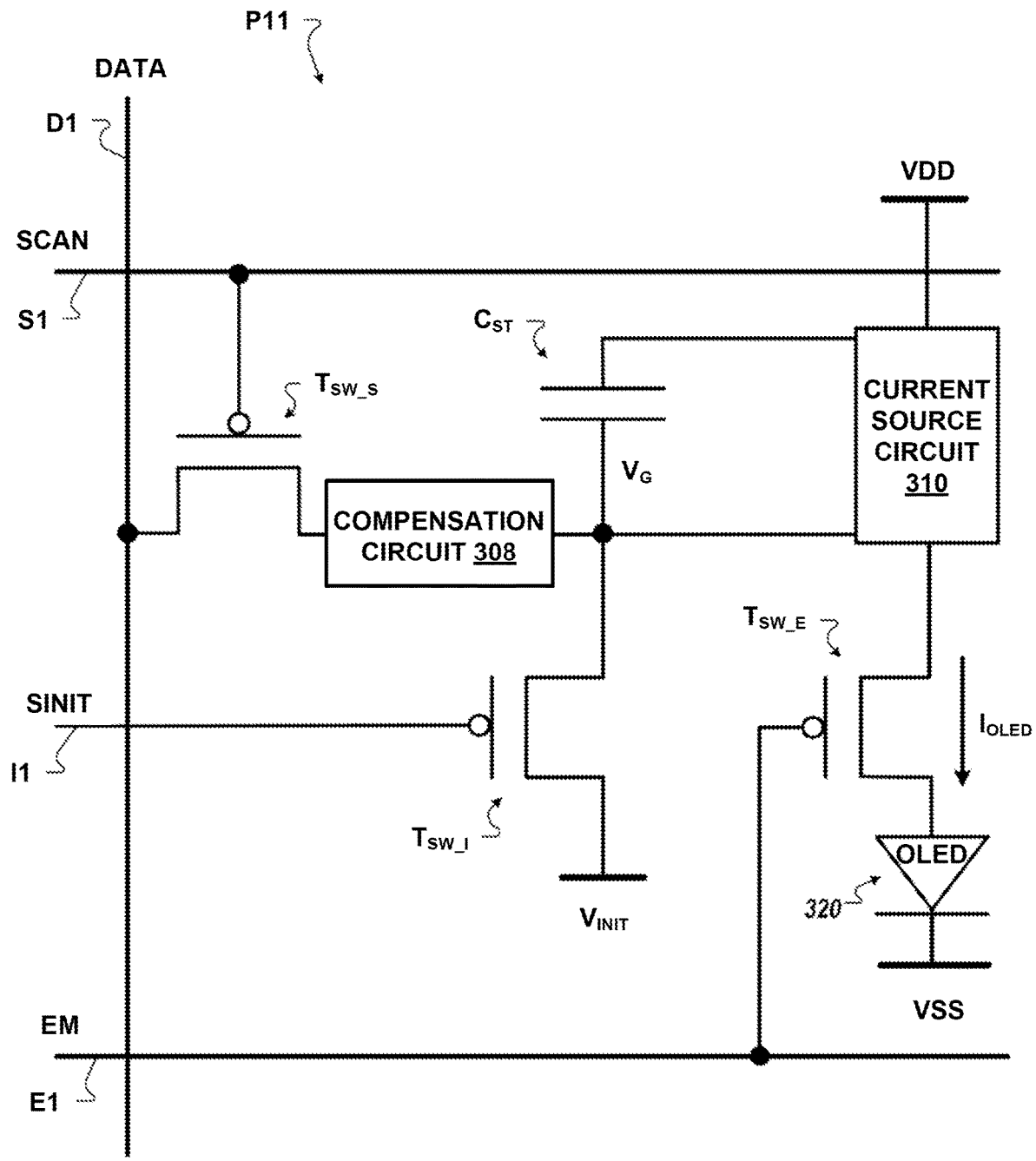
FIG. 3 is a diagram illustrating, in more detail, an example pixel circuit of a of an example pixel circuit of a display system included in the computing device shown in the example of FIG. 2.

Controller 206 may synchronize scan control signals 222, data control signals 224, and sensor control signals 226 to reduce interference between UDS 120 emissions and pixel light emissions. For example, controller 206 may synchronize sensor control signals 226 with scan control signals 222 to prevent UDS 120 from emitting electromagnetic energy during an EM signal pulse for pixel rows located near to UDS 120. Controller 206 may also synchronize sensor control signals 226 with scan control signals 222 to prevent UDS 120 from emitting electromagnetic radiation during a scan period for pixel rows located near to UDS 120. Example of controller 206 include, but are not limited to, a system on a chip (SoC), a display driver integrated circuit (DDIC), or other processing circuitry. FIG. 3 is a diagram illustrating, in more detail, an example pixel circuit of a of an example pixel circuit of a display system included in the computing device shown in the example of FIG. 2. In the example of FIG. 3, pixel P11 of the display system 200 (discussed above with respect to the example of FIG. 2) is shown in more detail. Pixel P11 represents an active matrix OLED (AMOLED) pixel. The pixel P11 is addressable by horizontal scan line S1, emission line E1, vertical data line D1, and initializing signal line I1. Pixel P11 receives a scan signal "SCAN" from scan line S1, a data voltage "DATA" from data line D1, and an emission signal "EM" from emission line E1. Pixel P11 also receives an initializing signal "SINIT" from an initial signal line I1. Pixel P11 receives power supply voltage VDD and an initial reference voltage VINIT. Pixel P11 is connected to a common ground VSS.

Pixel P11 includes an organic light-emitting diode (OLED) 320. OLED 320 includes a layer of an organic compound that emits light in response to an electric current, $I_{OLED}$. The organic layer is positioned between two electrodes: an anode and a cathode. Current source circuit 310 receives the supply voltage VDD and drives OLED 320 to emit light.

Pixel P11 includes a storage capacitor $C_{ST}$. Storage capacitor $C_{ST}$ may maintain the gate voltage $V_G$ during illumination of pixel P11. Pixel P11 also includes a compensation circuit 308 that may compensate for transistor property variations in the display panel.

Pixel P11 also includes multiple p-channel switching thin film transistors (TFTs). The switching TFTs include a signal TFT ($T_{SW\_S}$), an initializing TFT ($T_{SW\_I}$), and an emission TFT ($T_{SW\_E}$). In some examples, the switching TFTs can be n-channel transistors with the opposite polarity control signals.

During operation, switching TFT $T_{SW\_S}$ starts and stops the charging of the storage capacitor $C_{ST}$ based on receiving the SCAN signal from scan line S1. During an addressing period, scan line S1 turns on switching TFT $T_{SW\_S}$. Switching TFT $T_{SW\_S}$ provides the data voltage DATA from data line D1 to storage capacitor $C_{ST}$ and current source circuit 310.

Pixel P11 is programmed by the control signals: SCAN, SINIT, EM, and DATA. The OLED current, $I_{OLED}$, varies by the gate voltage $V_G$. When the gate voltage $V_G$ is steady, pixel P11 maintains a steady luminance throughout a frame time, displaying light corresponding to the supplied image data as programmed. A frame time, or frame period, is the amount of time between a start of a frame and a start of a next frame. The frame time can be the inverse of a frame rate of a display system. For example, a frame rate of 60 frames per second (fps) corresponds to a frame time of ⅟60 seconds, or 0.0167 seconds.

When current source circuit 310 receives the data voltage DATA through switching TFT $T_{SW\_S}$ and compensation circuit 308, the current source circuit 310 provides a specified current $I_{OLED}$ to the OLED 320 based on the received data voltage DATA, such that OLED 320 emits light in accordance with the electric current $I_{OLED}$. The intensity or brightness of the emitted light depends on the amount of electrical current $I_{OLED}$ applied. A higher current can result in brighter light compared to a lower current, which results in a lower relative brightness. Thus, the intensity of the light emitted from OLED 320 is based on the data voltage DATA that corresponds to image data for the individual pixel. The storage capacitor $C_{ST}$ maintains the pixel state (e.g., stores the gate voltage level $V_G$) such that pixel P11 remains illuminated continuously after the addressing period.

When switch TFT $T_{SW\_E}$ is turned off by the emission control signal EM, OLED 320 does not receive the emission current, $I_{OLED}$, and the pixel stops emitting light, thus, the longer turned-on duration of switch $T_{SW\_E}$ in a frame time, the brighter the pixel is, as known PWM driving. The duration of the turned-on time may be controlled as a global value across entire pixel array, not per individual pixels. Therefore, PWM method is used to control the entire panel brightness, not to pixel-by-pixel luminance control.

Although FIG. 2 and FIG. 3 illustrate example components of an OLED display, the described techniques may be applied to any panel display that includes an array of pixels. For example, the process for reducing artifacts due to electromagnetic radiation may be applied to light emitting diode (LED) panels, liquid crystal displays (LCD), and plasma display panels (PDP).

A computing device, such as computing device 100, may control brightness of pixels of a display, such as pixels of display panel 109, via modification of an amplitude and/or a duty ratio of an emission signal (e.g., EM) provided to the pixels (e.g., via one or both of pulse width modulation (PWM) and/or pulse amplitude modification (PAM)). For instance, when a brightness level of display 110 is above a threshold brightness (e.g., above 100 nits), computing device 100 may adjust the brightness level by adjusting the amplitude of the emission signal (EM). FIG. 4A is a conceptual diagram illustrating an example of pixel luminance when computing device 100 adjusts the brightness level by adjusting the amplitude of the emission signal (EM). Similarly, when the brightness level of display 110 is below the threshold brightness (e.g., below 100 nits), computing device 100 may adjust the brightness level by adjusting the duty ratio of the emission signal (EM). FIG. 4B is a conceptual diagram illustrating an example of pixel luminance when computing device 100 adjusts the brightness level by adjusting the pulse width of the emission signal (EM). As can be seen in FIGS. 4A and 4B, display 110 may perform several emission cycles per display frame time (e.g., four emission samples in the example of FIGS. 4A and 4B). A display frame time may be the amount of time that a single frame of image data is output by the display.

As noted above, UDS 120 of computing device 100 of FIG. 1A may sense a fingerprint of a user based on light emitted by pixels of display panel 109. In general, it may be desirable for the portion of display panel 109 overlying UDS 120 to output a large quantity of light (e.g., operate a high illumination, such as 600 nits or more). However, when computing device 100 operates display panel 109 at a low brightness setting (e.g., 50 nits), the relatively low quantity of light may make it difficult for enough light to be reflect to receiver 114 for a fingerprint to be adequately sensed. As such, it may be desirable for the pixels of display panel 109 that overlie UDS 120 to operate at a high brightness level (e.g., emit a large amount of light) during operation of UDS 120. However, to avoid interfering with other pixels of display panel 109, it may be desirable for the pixels that overlie UDS 120 to operate at the high brightness level without interfering with apparent brightness levels of other pixels of display panel 109 (i.e., pixels that do not overlie UDS 120). As such, computing device 100 may activate a local high brightness mode (LHBM) by at least increasing a brightness of a first portion of display panel 109 that overlies UDS 120.

Figure 5:
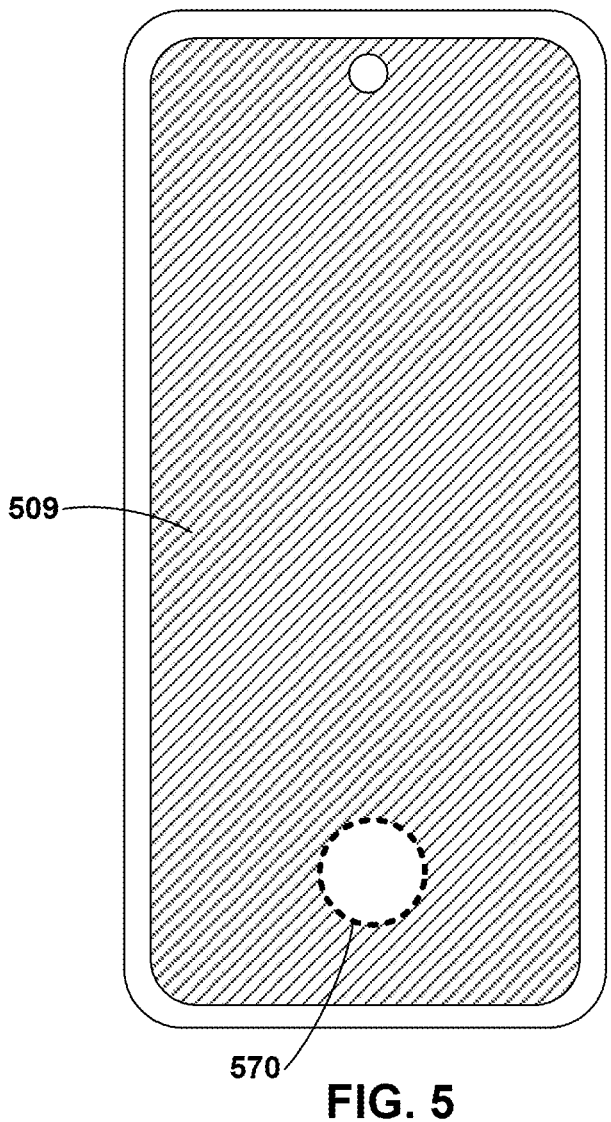
FIG. 5 is a conceptual diagram illustrating activation of local high brightness mode (LHBM).

FIG. 5 is a conceptual diagram illustrating activation of local high brightness mode. As can be seen in FIG. 5, a brightness of region 570 of display panel 509 (which may be an example of region 170 of display 110 of FIG. 1A) may be substantially increased relative to other regions of display panel 509. As discussed above, the light emitted by pixels in region 570 may be used by an under-display fingerprint sensor (e.g., UDS 120) to sense a fingerprint of a user.

Activation of LHBM may involve controlling brightness using pulse amplitude modulation (with special data voltage (DATA in FIG. 3) being applied to pixels overlying UDS 120). FIGS. 6A and 6B are conceptual diagrams illustrating examples of pixel luminance when computing device 100 activates the LHBM. FIG. 6A illustrates an example luminance of pixels not included in the region overlying the under-display sensor (e.g., not included in region 170/570). FIG. 6B illustrates an example luminance of pixels included in the region overlying the under-display sensor (e.g., included in region 170/570). As can be seen in FIGS. 6A and 6B, control of the display panel may switch from PWM to PAM when LHBM is activated (e.g., responsive to activation of UDS 120).

However, as discussed above, activation of the local high brightness mode may result in visible artifacts in the display (e.g., flicker). For instance, even though the computing device may maintain a static luminance of pixels not overlying the fingerprint sensor during LHBMs by adjusting the amplitude (e.g., a static controlled brightness), a flicker may be introduced due to hysteresis effects in the pixel transistors in the display panel. This phenomenon may result because the pixel circuit transistors may not respond immediately due to the hysteresis characteristics. After 1 or 2 frame times of intermediate luminance periods, the pixel transistors may settle to the status for the new data voltage, and generate the target current for the display device. Because of the short period of intermediate luminance time, a user may see a flicker from the background region of the display (e.g., region of the display not overlying the fingerprint sensor).

Figure 7:
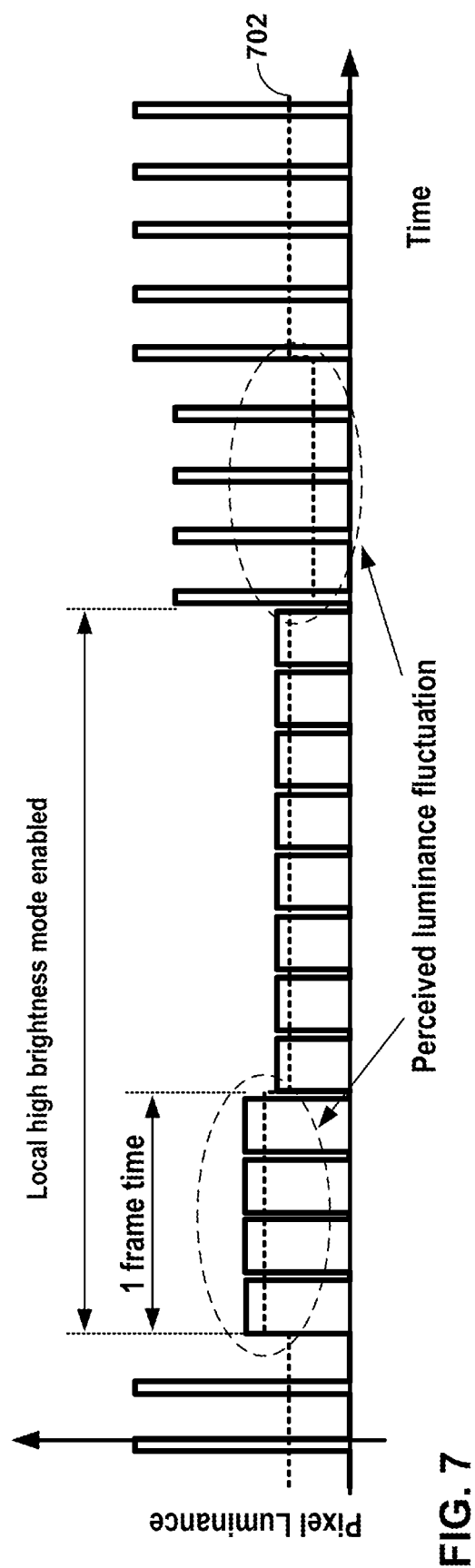
FIG. 7 is a conceptual diagram illustrating an example luminance of pixels not included in the region overlying the under-display sensor when the local high brightness mode is activated.

FIG. 7 is a conceptual diagram illustrating an example luminance of pixels not included in the region overlying the under-display sensor when the local high brightness mode is activated. As can be seen in FIG. 7, for several emission cycles (e.g., 1 frame time) following activation of local high brightness mode (e.g., when brightness control switches from PWM to PAM), there may be an increase in the perceived luminance of the pixels not included in the region overlying the under-display sensor. Similarly, for several emission cycles (e.g., 1 frame time) following deactivation of local high brightness mode (e.g., when brightness control switches from PAM to PWM), there may be a decrease in the perceived luminance of the pixels (e.g., perceived luminance 706) not included in the region overlying the under-display sensor. One or both of the increase and decrease may be visually perceived as a flicker, which may be undesirable.

In accordance with one or more aspects of this disclosure, when transitioning to the local high brightness mode, a computing device (e.g., computing device 100) may temporarily adjust a brightness level of pixels of display panel 109 not overlying the fingerprint sensor. For instance, responsive to activation of UDS 120 (i.e., a fingerprint sensor), processing circuitry of computing device 100 may activate a local high brightness mode of display 110 by at least increasing a brightness of a first portion of display panel 109 that overlies UDS 120 (e.g., region 170/570); and temporarily decrease controlled brightness of a second portion of display panel 109 that is non-overlapping with the first portion (e.g., portions of display panel 109 other than region 170/570). As transitioning to the local high brightness mode may result in a temporary visible increase in the brightness of pixels of display panel 109 that do not overlie UDS 120, the temporary adjustment of the controlled brightness level may, at least in part, cancel-out said temporary visible increase in brightness (e.g., such that the apparent brightness level of the second portion remains consistent). In this way, computing device 100 may eliminate and/or reduce the visual appearance of such visible artifacts when transitioning into the local high brightness mode.

Computing device 100 may adjust (e.g., increase and/or decrease) the controlled brightness level of display panel 109 in a variety of manners. As one example, computing device 100 may adjust a programmed brightness level by applying an intermediate brightness value in the display for the intermediate low/high display frames. Further details of this technique are discussed below with reference to FIG. 8. As another example, computing device 100 may adjust a duty ratio by applying an intermediate duty ratio in the display for the intermediate low/high display frames. Further details of this technique are discussed below with reference to FIG. 9.

Figure 8:
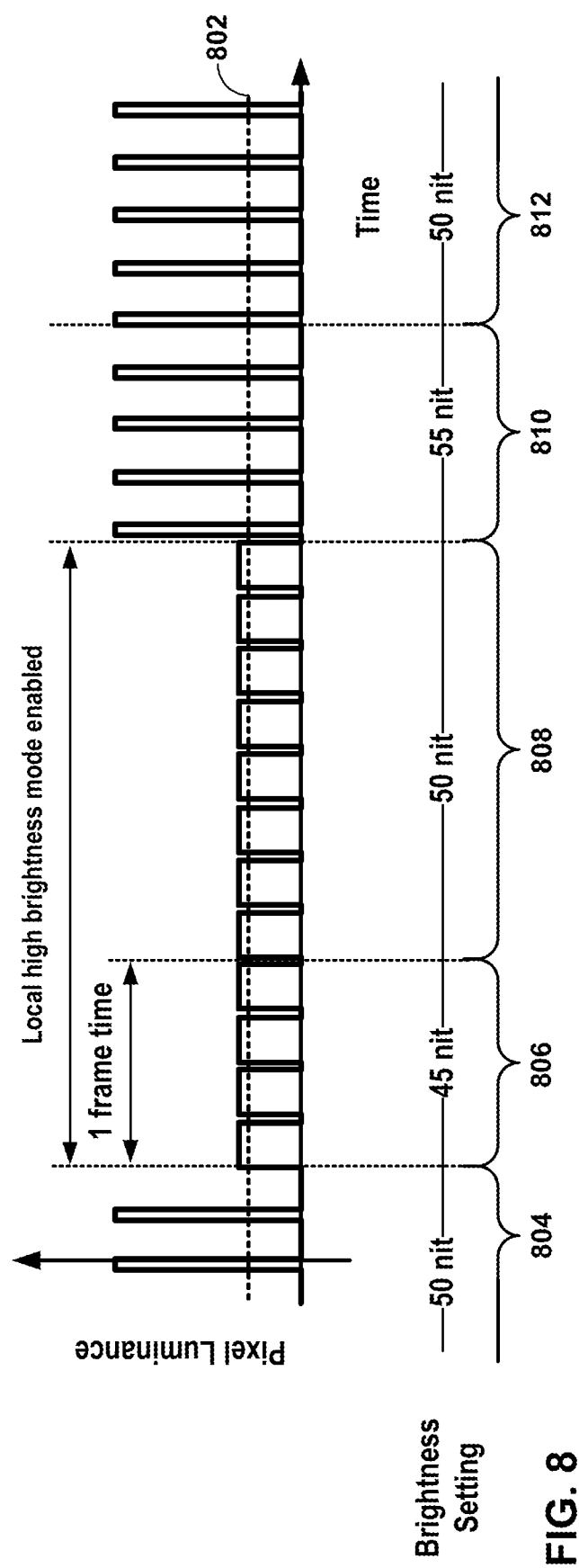
FIG. 8 is a conceptual diagram illustrating an example luminance of pixels not included in the region overlying the under-display sensor when the local high brightness mode is activated, in accordance with one or more aspects of this disclosure.

FIG. 8 is a conceptual diagram illustrating an example luminance of pixels not included in the region overlying the under-display sensor when the local high brightness mode is activated, in accordance with one or more aspects of this disclosure. The luminance levels illustrated in FIG. 8 are broken up into five time periods. Time period 804 includes example steady state luminance levels prior to activation of local high brightness mode (e.g., higher to activation of an under-display fingerprint sensor, such as UDS 120 of FIG. 1A). Time period 806 includes example luminance levels during a transition into local high brightness mode. Time period 808 includes example luminance levels during steady state local high brightness mode. Time period 810 includes example luminance levels during a transition out of local high brightness mode. Time period 812 includes example steady state luminance levels after deactivation of local high brightness mode.

In accordance with one or more aspects of this disclosure, a computing device, such as computing device 100 of FIG. 1A, may decrease controlled brightness of a second portion of the display panel (e.g., portions of display panel 109/509 other than region 170/570), by decreasing a programmed brightness level of the second portion of the display panel. Subsequently the computing device may increase the controlled brightness of the second portion of the display panel by increasing the programmed brightness level of the second portion of the display panel. In this way, the computing device may apply an intermediate brightness value in the display for the intermediate low/high display frames.

For example, as shown in FIG. 8, during time period 804 (i.e., prior to activation local high brightness mode), the computing device may set the programmed brightness level to be 50 nits. In this way, prior to activation of a fingerprint sensor (e.g., time period 804), the computing device may operate the second portion of the display panel at a first brightness level.

During time period 806, to temporarily decrease controlled brightness of the second portion of the display responsive to activation of the fingerprint sensor the computing device may set the programmed brightness level to be a reduced level that will cancel-out hysteresis induced artifacts, 45 nits in this example (e.g., to compensate the abnormally high luminance of the first frame, or first n frames, in local high brightness mode). During time period 808, the computing device may undo the temporary decrease and restore the programmed brightness level to that of time period 804, 50 nits in this example. In this way, to temporarily decrease the controlled brightness of the second portion of the display panel, the computing device may decrease, for a first period of time (e.g., time period 806), the controlled brightness of the second portion of the display panel to a second brightness level that is less than the first brightness level, and increase, after the first period of time and while the local high brightness mode remains activated (e.g., time period 808), the controlled brightness of the second portion of the display panel to the first brightness level.

During time period 810, to temporarily increase controlled brightness of the second portion of the display panel responsive to deactivation of the local high brightness mode, the computing device may set the programmed brightness level to be an elevated level that will cancel-out hysteresis induced artifacts, 55 nits in this example (e.g., to compensate the abnormally low luminance of the first frame, or first n frames, following local high brightness mode). Then, during time period 812, the computing device may set the programmed brightness level to the original brightness level of time period 804, 50 nits in this example. In this way, to temporarily increase controlled brightness of the second portion of the display panel, the computing device may increase, for a second period of time (e.g., time period 810), the brightness of the second portion of the display panel to a third brightness level that is greater than the first brightness level, and decrease, after the second period of time (e.g., time period 812), the brightness of the second portion of the display panel to the first brightness level. Through these techniques, the computing device may enable the background region of the display (e.g., portions of display panel 109/509 other than region 170/570) to maintain the same user-perceived luminance/brightness level (e.g., perceived luminance 802) across the entire operation.

Figure 9:
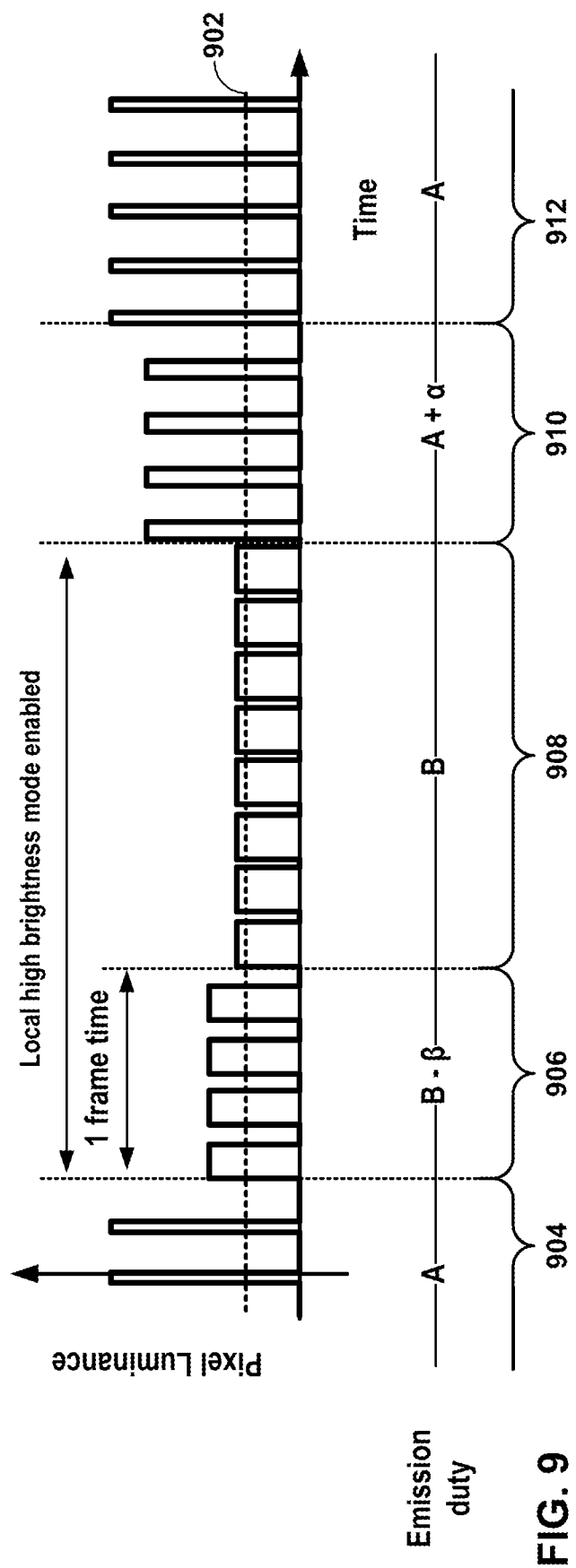
FIG. 9 is a conceptual diagram illustrating an example luminance of pixels not included in the region overlying the under-display sensor when the local high brightness mode is activated, in accordance with one or more aspects of this disclosure.

FIG. 9 is a conceptual diagram illustrating an example luminance of pixels not included in the region overlying the under-display sensor when the local high brightness mode is activated, in accordance with one or more aspects of this disclosure. The luminance levels illustrated in FIG. 9 are broken up into five time periods. Time period 904 includes example steady state luminance levels prior to activation of local high brightness mode (e.g., higher to activation of an under-display fingerprint sensor, such as UDS 120 of FIG. 1A). Time period 906 includes example luminance levels during a transition into local high brightness mode. Time period 908 includes example luminance levels during steady state local high brightness mode. Time period 910 includes example luminance levels during a transition out of local high brightness mode. Time period 912 includes example steady state luminance levels after deactivation of local high brightness mode.

In accordance with one or more aspects of this disclosure, a computing device, such as computing device 100 of FIG. 1A, may decrease controlled brightness of a second portion of the display panel (e.g., portions of display panel 109/509 other than region 170/570), by decreasing a duty ratio of the second portion of the display panel. Subsequently the computing device may increase the controlled brightness of the second portion of the display panel by increasing the duty ratio of the second portion of the display panel. In this way, the computing device may apply an intermediate duty ratio in the display for the intermediate low/high display frames.

For example, as shown in FIG. 9, during time period 904 (i.e., prior to activation local high brightness mode), the computing device may set the duty ratio to be A. In this way, prior to activation of a fingerprint sensor (e.g., time period 904), the computing device may operate the second portion of the display panel at a first brightness level (e.g., the brightness level resulting from duty ratio A).

During time period 906, to temporarily decrease controlled brightness of the second portion of the display responsive to activation of the fingerprint sensor the computing device may set the duty ratio to be a reduced level that will cancel-out hysteresis induced artifacts, B-β in this example (e.g., to compensate the abnormally high luminance of the first frame, or first n frames, in local high brightness mode). During time period 908, the computing device may undo the temporary brightness decrease set the duty ratio to one that will result in the same brightness level as time period 906 when driven with a reduced amplitude, B in this example (e.g., with B being greater than A). In this way, to temporarily decrease the controlled brightness of the second portion of the display panel, the computing device may decrease, for a first period of time (e.g., time period 906), the controlled brightness of the second portion of the display panel to a second brightness level that is less than the first brightness level, and increase, after the first period of time and while the local high brightness mode remains activated (e.g., time period 908), the controlled brightness of the second portion of the display panel to the first brightness level.

During time period 910, to temporarily increase controlled brightness of the second portion of the display panel responsive to deactivation of the local high brightness mode, the computing device may set the duty ratio to be an elevated level that will cancel-out hysteresis induced artifacts, A+α in this example (e.g., to compensate the abnormally low luminance of the first frame, or first n frames, following local high brightness mode). Then, during time period 912, the computing device may result using the original duty ratio of A from time period 904. In this way, to temporarily increase controlled brightness of the second portion of the display panel, the computing device may increase, for a second period of time (e.g., time period 910), the brightness of the second portion of the display panel to a third brightness level that is greater than the first brightness level, and decrease, after the second period of time (e.g., time period 912), the controlled brightness of the second portion of the display panel to the first brightness level. Through these techniques, the computing device may enable the background region of the display (e.g., portions of display panel 109/509 other than region 170/570) to maintain the same user-perceived luminance level (e.g., perceived luminance 902) across the entire operation.

Figure 10:
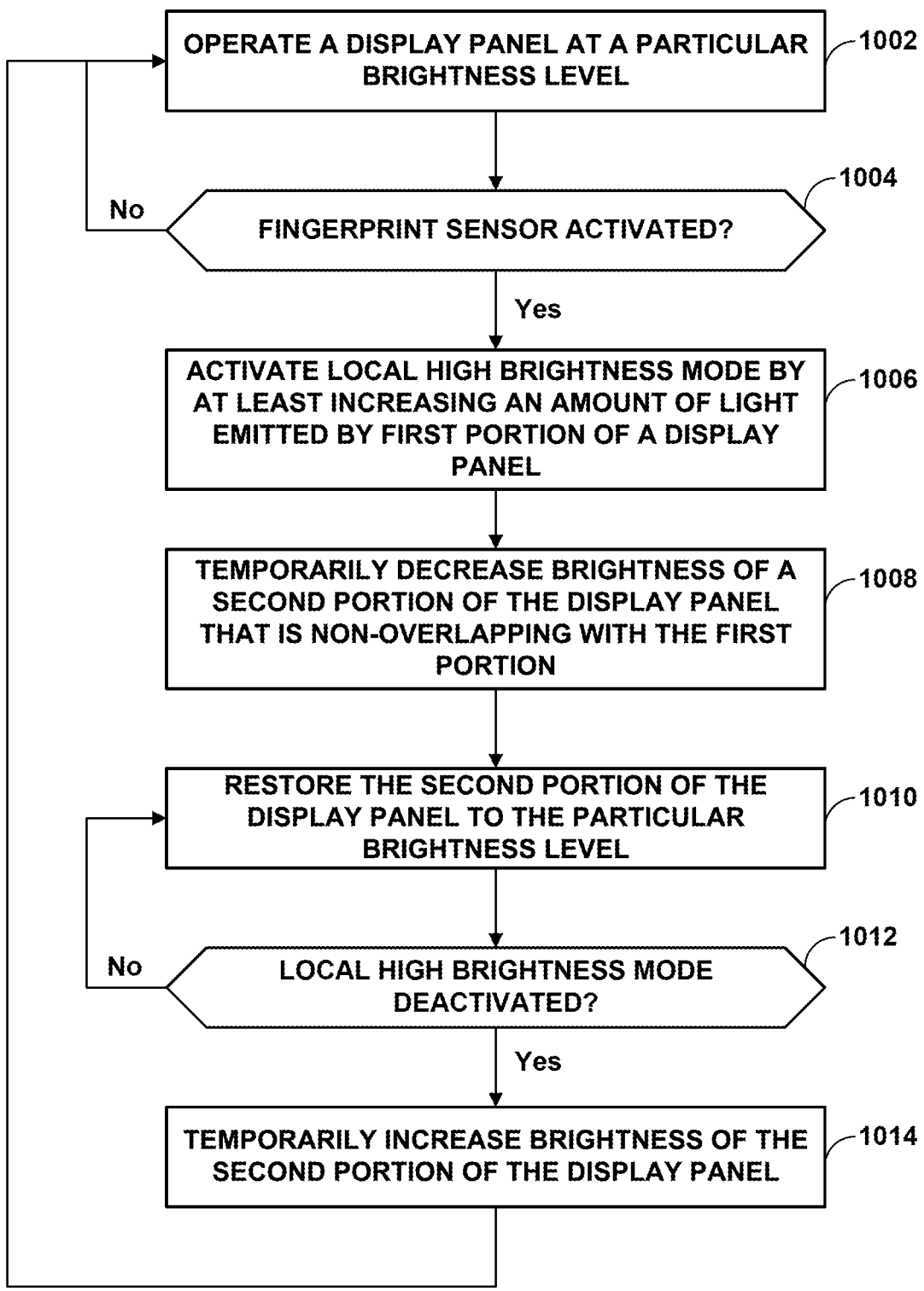
FIG. 10 is a flowchart illustrating a method for reducing perceived luminance changes resulting from operation of an under-display fingerprint sensor, in accordance with one or more techniques of this disclosure.

FIG. 10 is a flowchart illustrating a method for reducing perceived luminance changes resulting from operation of an under-display fingerprint sensor, in accordance with one or more techniques of this disclosure. While described in the context of device 100 of FIGS. 1A and 1B, other devices may perform the method of FIG. 10.

Computing device 100 may initially operate a display panel at a particular controlled brightness level (1002). For instance, prior to activation of a fingerprint sensor (e.g., UDS 120), processing circuitry of computing device 100 (e.g., controller 206) may operate the display panel (e.g., display panel 109) at a relatively low brightness level (e.g., less than a brightness threshold) such that brightness of the display panel is controlled by adjustment of emission duty ratio (e.g., PWM).

Computing device 100 may determine whether a fingerprint sensor has been activated (1004). For instance, the processing circuitry may determine whether an application executing at computing device 100 and/or an operating system of computing device 100 has requested activation of the fingerprint sensor (e.g., to authenticate a user of computing device 100). Responsive to determining that the fingerprint sensor has not been activated ("No" branch of 1004), computing device 100 may continue to operate the display panel at the particular controlled brightness level (1002) (e.g., unless altered due to ambient light, user settings, or other factors).

Responsive to determining that the fingerprint sensor has been activated ("Yes" branch of 1004), computing device 100 may activate a local high brightness mode by at least increasing an amount of light radiated from (e.g., increase a brightness of) a first portion of the display panel that overlies the fingerprint sensor (1006); and temporarily decrease controlled brightness of a second portion of the display panel that is non-overlapping with the first portion (1008). As discussed above, computing device 100 may adjust (e.g., decrease/increase) the brightness via adjustment of programmed brightness level (e.g., as discussed with reference to FIG. 8), or adjustment of duty ratio (e.g., as discussed with reference to FIG. 9). In some examples, the determination of whether to activate local high brightness and to temporarily adjust the brightness of the second portion may be based on more than just activation of the fingerprint sensor. For instance, computing device 100 may activate local high brightness and temporarily adjust the brightness of the second portion responsive to activation of the fingerprint sensor where prior to activation of the fingerprint sensor, the brightness of the second portion of the display panel is less than a brightness threshold (e.g., such that brightness of the display panel was controlled by adjustment of emission duty ratio (e.g., PWM)).

After temporarily decreasing the controlled brightness, computing device 100 may restore the second portion of the display panel to the particular controlled brightness level (1010) and determine whether local high brightness mode has been deactivated (1012). Local high brightness mode may be deactivated when fingerprint sensing is complete. For instance, computing device 100 may determine to deactivate high brightness mode responsive to successful authentication of a user's fingerprint via the fingerprint sensor. Responsive to determining that local high brightness mode has not been deactivated ("No" branch of 1012), computing device 100 may continue to operate the display panel at the particular controlled brightness level (1010).

Responsive to determining that local high brightness mode has been deactivated ("Yes" branch of 1012), computing device 100 may temporarily increase controlled brightness of the second portion of the display panel (1014). After temporarily increasing the controlled brightness, computing device 100 may restore the second portion of the display panel to the particular controlled brightness level (1002).

As discussed above, computing device 100 may temporarily adjust (decrease and/or increase) controlled brightness of the second portion of the display panel. The temporary aspect may be for a particular time period, a particular quantity of emission periods, or a particular quantity of frames (e.g., n frames).

The following numbered examples may illustrate one or more aspects of the disclosure:

Example 1

A device comprising: a display panel; a fingerprint sensor positioned under the display panel and configured to sense a fingerprint through the display panel; and processing circuitry configured to: responsive to activation of the fingerprint sensor: activate a local high brightness mode by at least increasing a brightness of a first portion of the display panel that overlies the fingerprint sensor; and temporarily decrease controlled brightness of a second portion of the display panel that is non-overlapping with the first portion.

Example 2

The device of example 1, wherein: the processing circuitry is configured to operate, prior to activation of the fingerprint sensor, the second portion of the display panel at a first brightness level, to temporarily decrease the controlled brightness of the second portion of the display panel, the processing circuitry is configured to: decrease, for a first period of time, the controlled brightness of the second portion of the display panel to a second brightness level that is less than the first brightness level, and increase, after the first period of time and while the local high brightness mode remains activated, the controlled brightness of the second portion of the display panel to the first brightness level.

Example 3

The device of example 1, wherein to temporarily decrease the controlled brightness of the second portion of the display panel, the processing circuitry is configured to decrease the controlled brightness of the second portion of the display panel for n frames.

Example 4

The device of example 1, wherein the processing circuitry is further configured to: temporarily increase, responsive to deactivation of the local high brightness mode, the controlled brightness of the second portion of the display panel.

Example 5

The device of example 4, wherein: to temporarily increase the controlled brightness of the second portion of the display panel, the processing circuitry is configured to: increase, for a second period of time, the controlled brightness of the second portion of the display panel to a third brightness level that is greater than the first brightness level, and decrease, after the second period of time, the controlled brightness of the second portion of the display panel to the first brightness level.

Example 6

The device of example 4, wherein to temporarily increase the controlled brightness of the second portion of the display panel, the processing circuitry is configured to increase the controlled brightness of the second portion of the display panel for n frames.

Example 7

The device of example 1, wherein, to decrease the controlled brightness of the second portion of the display panel, the processing circuitry is configured to decrease a programmed brightness level of the second portion of the display panel, and wherein, to increase the controlled brightness of the second portion of the display panel, the processing circuitry is configured to increase the programmed brightness level of the second portion of the display panel.

Example 8

The device of example 1, wherein, to decrease the controlled brightness of the second portion of the display panel, the processing circuitry is configured to decrease an emission duty ratio of the second portion of the display panel, and wherein, to increase the controlled brightness of the second portion of the display panel, the processing circuitry is configured to increase the emission duty ratio of the second portion of the display panel.

Example 9

The device of example 1, wherein, to activate the local high brightness mode and temporarily decrease the brightness of the second portion of the display panel, the processing circuitry is configured to: activate the local high brightness mode and temporarily decrease the controlled brightness of the second portion of the display panel responsive to: activation of the fingerprint sensor; and determining that, prior to activation of the fingerprint sensor, the controlled brightness of the second portion of the display panel is less than a brightness threshold.

Example 10

The device of example 9, wherein, to determine that the controlled brightness of the second portion of the display panel is less than the brightness threshold, the processing circuitry is configured to: determine that, prior to activation of the fingerprint sensor, the processing circuitry is controlling brightness of the display panel using pulse width modulation (PWM).

Example 11

The device of example 1, wherein the display comprises an organic light-emitting diode display (OLED).

Example 12

A method comprising: responsive to activation of a fingerprint sensor positioned under a display panel and configured to sense a fingerprint through the display panel: activating a local high brightness mode by at least increasing a brightness of a first portion of the display panel that overlies the fingerprint sensor; and temporarily decreasing controlled brightness of a second portion of the display panel that is non-overlapping with the first portion.

Example 13

The method of example 12, further comprising: operating, prior to activation of the fingerprint sensor, the second portion of the display panel at a first brightness level, wherein temporarily decreasing the brightness of the second portion of the display panel comprises: decreasing, for a first period of time, the controlled brightness of the second portion of the display panel to a second brightness level that is less than the first brightness level, and increasing, after the first period of time and while the local high brightness mode remains activated, the controlled brightness of the second portion of the display panel to the first brightness level.

Example 14

The method of example 12, further comprising: temporarily increasing, responsive to deactivation of the local high brightness mode, controlled brightness of the second portion of the display panel.

Example 15

The method of example 12, wherein activating the local high brightness mode and temporarily decreasing the controlled brightness of the second portion of the display panel responsive to activation of the fingerprint sensor comprises: activating the local high brightness mode and temporarily decreasing the controlled brightness of the second portion of the display panel responsive to: activation of the fingerprint sensor; and determining that, prior to activation of the fingerprint sensor, the controlled brightness of the second portion of the display panel is less than a brightness threshold.

Example 16

A computer-readable storage medium storing instructions that, when executed by a controller of a device, cause the controller to: responsive to activation of a fingerprint sensor of the device positioned under a display panel of the device and configured to sense a fingerprint through the display panel: activate a local high brightness mode by at least increasing a brightness of a first portion of the display panel that overlies the fingerprint sensor; and temporarily decrease controlled brightness of a second portion of the display panel that is non-overlapping with the first portion.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A device comprising:
a display panel;
a fingerprint sensor configured to sense a fingerprint through the display panel; and
processing circuitry configured to:
responsive to activation of the fingerprint sensor:
activate a local high brightness mode by at least increasing an amount of light radiated from a first portion of the display panel that overlies the fingerprint sensor; and
temporarily decrease controlled brightness of a second portion of the display panel that is non-overlapping with the first portion.

2. The device of claim 1, wherein:
the processing circuitry is configured to operate, prior to activation of the fingerprint sensor, the second portion of the display panel at a first brightness level,
to temporarily decrease the controlled brightness of the second portion of the display panel, the processing circuitry is configured to:
decrease, for a first period of time, the controlled brightness of the second portion of the display panel to a second brightness level that is less than the first brightness level, and
increase, after the first period of time and while the local high brightness mode remains activated, the controlled brightness of the second portion of the display panel to the first brightness level.

3. The device of claim 2, wherein the processing circuitry is further configured to:
temporarily increase, responsive to deactivation of the local high brightness mode, the controlled brightness of the second portion of the display panel.

4. The device of claim 3, wherein:
to temporarily increase the controlled brightness of the second portion of the display panel, the processing circuitry is configured to:
increase, for a second period of time, the controlled brightness of the second portion of the display panel to a third brightness level that is greater than the first brightness level, and
decrease, after the second period of time, the controlled brightness of the second portion of the display panel to the first brightness level.

5. The device of claim 3, wherein to temporarily increase the controlled brightness of the second portion of the display panel, the processing circuitry is configured to increase the controlled brightness of the second portion of the display panel for n frames.

6. The device of claim 1, wherein to temporarily decrease the controlled brightness of the second portion of the display panel, the processing circuitry is configured to decrease the controlled brightness of the second portion of the display panel for n frames.

7. The device of claim 1, wherein, to decrease the controlled brightness of the second portion of the display panel, the processing circuitry is configured to decrease a programmed brightness level of the second portion of the display panel, and wherein, to increase the controlled brightness of the second portion of the display panel, the processing circuitry is configured to increase the programmed brightness level of the second portion of the display panel.

8. The device of claim 1, wherein, to decrease the controlled brightness of the second portion of the display panel, the processing circuitry is configured to decrease an emission duty ratio of the second portion of the display panel, and wherein, to increase the controlled brightness of the second portion of the display panel, the processing circuitry is configured to increase the emission duty ratio of the second portion of the display panel.

9. The device of claim 1, wherein, to activate the local high brightness mode and temporarily decrease the brightness of the second portion of the display panel, the processing circuitry is configured to:
activate the local high brightness mode and temporarily decrease the controlled brightness of the second portion of the display panel responsive to:
activation of the fingerprint sensor; and
determining that, prior to activation of the fingerprint sensor, the controlled brightness of the second portion of the display panel is less than a brightness threshold.

10. The device of claim 9, wherein, to determine that the controlled brightness of the second portion of the display panel is less than the brightness threshold, the processing circuitry is configured to:
determine that, prior to activation of the fingerprint sensor, the processing circuitry is controlling brightness of the display panel using pulse width modulation (PWM).

11. The device of claim 1, wherein the display comprises an organic light-emitting diode display (OLED).

12. A method comprising:
responsive to activation of a fingerprint sensor that is configured to sense a fingerprint through a display panel:
activating a local high brightness mode by at least increasing an amount of light radiated from a first portion of the display panel that overlies the fingerprint sensor; and
temporarily decreasing controlled brightness of a second portion of the display panel that is non-overlapping with the first portion.

13. The method of claim 12, further comprising:
operating, prior to activation of the fingerprint sensor, the second portion of the display panel at a first brightness level,
wherein temporarily decreasing the brightness of the second portion of the display panel comprises:
decreasing, for a first period of time, the controlled brightness of the second portion of the display panel to a second brightness level that is less than the first brightness level, and
increasing, after the first period of time and while the local high brightness mode remains activated, the controlled brightness of the second portion of the display panel to the first brightness level.

14. The method of claim 12, further comprising:
temporarily increasing, responsive to deactivation of the local high brightness mode, controlled brightness of the second portion of the display panel.

15. The method of claim 12, wherein activating the local high brightness mode and temporarily decreasing the controlled brightness of the second portion of the display panel responsive to activation of the fingerprint sensor comprises:
activating the local high brightness mode and temporarily decreasing the controlled brightness of the second portion of the display panel responsive to:
activation of the fingerprint sensor; and
determining that, prior to activation of the fingerprint sensor, the controlled brightness of the second portion of the display panel is less than a brightness threshold.

16. A non-transitory computer-readable storage medium storing instructions that, when executed by a controller of a device, cause the controller to:
responsive to activation of a fingerprint sensor of the device that is configured to sense a fingerprint through a display panel of the device:
activate a local high brightness mode by at least increasing an amount of light radiated from a first portion of the display panel that overlies the fingerprint sensor; and
temporarily decrease controlled brightness of a second portion of the display panel that is non-overlapping with the first portion.

17. The non-transitory computer-readable storage medium of claim 16, further comprising instructions that cause the controller to:
temporarily increase, responsive to deactivation of the local high brightness mode, controlled brightness of the second portion of the display panel.

18. The non-transitory computer-readable storage medium of claim 16, wherein the instructions that cause the controller to activate the local high brightness mode and temporarily decrease the controlled brightness of the second portion of the display panel responsive to activation of the fingerprint sensor comprise instructions that cause the controller to:
activate the local high brightness mode and temporarily decrease the controlled brightness of the second portion of the display panel responsive to:
activation of the fingerprint sensor, and
determining that, prior to activation of the fingerprint sensor, the controlled brightness of the second portion of the display panel is less than a brightness threshold.

19. The non-transitory computer-readable storage medium of claim 16, further comprising instructions that cause the controller to:
operate, prior to activation of the fingerprint sensor, the second portion of the display panel at a first brightness level,
wherein the instructions that cause the controller to temporarily decrease the brightness of the second portion of the display panel comprise instructions that cause the controller to:
decrease, for a first period of time, the controlled brightness of the second portion of the display panel to a second brightness level that is less than the first brightness level, and
increase, after the first period of time and while the local high brightness mode remains activated, the controlled brightness of the second portion of the display panel to the first brightness level.

* * * * *